(12) United States Patent
Asaoka et al.

(10) Patent No.: US 8,983,520 B2
(45) Date of Patent: Mar. 17, 2015

(54) RADIO BASE STATION, AND COMMUNICATION CONTROL METHOD

(75) Inventors: Susumu Asaoka, Kanagawa (JP); Shinji Nakano, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 297 days.

(21) Appl. No.: 13/518,802

(22) PCT Filed: Dec. 24, 2010

(86) PCT No.: PCT/JP2010/073356
§ 371 (c)(1),
(2), (4) Date: Jun. 22, 2012

(87) PCT Pub. No.: WO2011/078329
PCT Pub. Date: Jun. 30, 2011

(65) Prior Publication Data
US 2012/0258764 A1    Oct. 11, 2012

(30) Foreign Application Priority Data
Dec. 24, 2009  (JP) .................. 2009-293512

(51) Int. Cl.
*H04B 7/00*  (2006.01)
*H04W 16/08* (2009.01)
(Continued)

(52) U.S. Cl.
CPC .............. *H04W 16/08* (2013.01); *H04W 52/04* (2013.01); *H04W 52/343* (2013.01)
USPC ............. 455/522; 455/69; 455/453; 455/450; 455/509; 455/550.1; 370/328; 370/329; 370/338; 370/343

(58) Field of Classification Search
CPC . H04W 52/243; H04W 52/34; H04W 52/346; H04W 28/08; H04W 16/06; H04W 52/343; H04W 52/04
USPC ............. 455/522, 69, 127.1, 453, 450, 509, 455/436–444, 422.1, 403, 550.1, 426.1, 455/426.2; 370/328, 329, 338, 343
See application file for complete search history.

(56) References Cited

U.S. PATENT DOCUMENTS

| | | | | |
|---|---|---|---|---|
| 5,276,907 A | * | 1/1994 | Meidan | ............. 455/436 |
| 2007/0253385 A1 | * | 11/2007 | Li et al. | ............. 370/338 |
| 2008/0232266 A1 | | 9/2008 | Jitsui et al. | |

FOREIGN PATENT DOCUMENTS

| | | |
|---|---|---|
| JP | 09-163435 | 6/1997 |
| JP | 2004-343544 | 12/2004 |
| JP | 2006-101442 A | 4/2006 |

(Continued)

OTHER PUBLICATIONS

An Office Action; "Notice of Reason for Rejection," issued by the Japanese Patent Office on Oct. 22, 2013, which corresponds to Japanese Patent Application No. 2011-547649 and is related to U.S. Appl. No. 13/518,802; with English statement of relevance.

(Continued)

*Primary Examiner* — Keith Ferguson
(74) *Attorney, Agent, or Firm* — Studebaker & Brackett PC

(57) ABSTRACT

A radio base station (1) measures the volume of communication with radio terminals connected to said radio base station (1), and if said volume of communication exceeds a threshold value, the radio signal transmission power of the base station is decreased, and a request is made to other radio base stations to increase the radio signal transmission power of said other radio base stations.

7 Claims, 6 Drawing Sheets

(51) Int. Cl.
*H04W 52/34* (2009.01)
*H04W 52/04* (2009.01)

(56) References Cited

FOREIGN PATENT DOCUMENTS

| | | |
|---|---|---|
| JP | 2006-203305 | 8/2006 |
| JP | 2008-236307 | 10/2008 |

OTHER PUBLICATIONS

International Search Report; PCT/JP2010/073356; Feb. 8, 2011.
An Office Action "Notification of Reason for Rejection" issued by the Japanese Patent Office on Jul. 9, 2013, which corresponds to Japanese Patent Application No. 2011-547649 and is related to U.S. Appl. No. 13/518,802; with the Statement of Relevance of Non-English References.

* cited by examiner

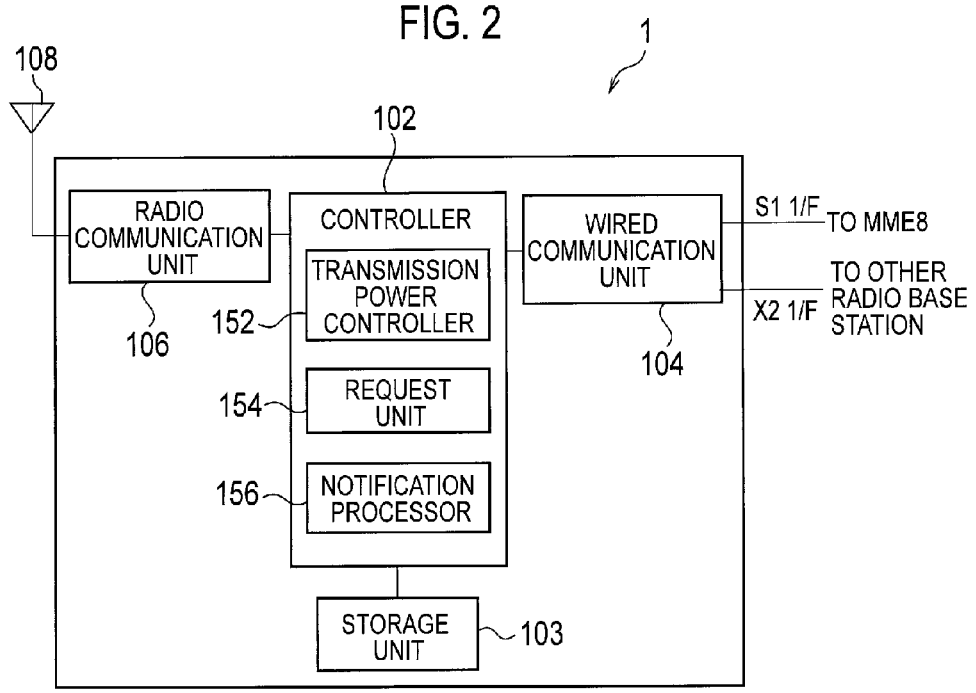

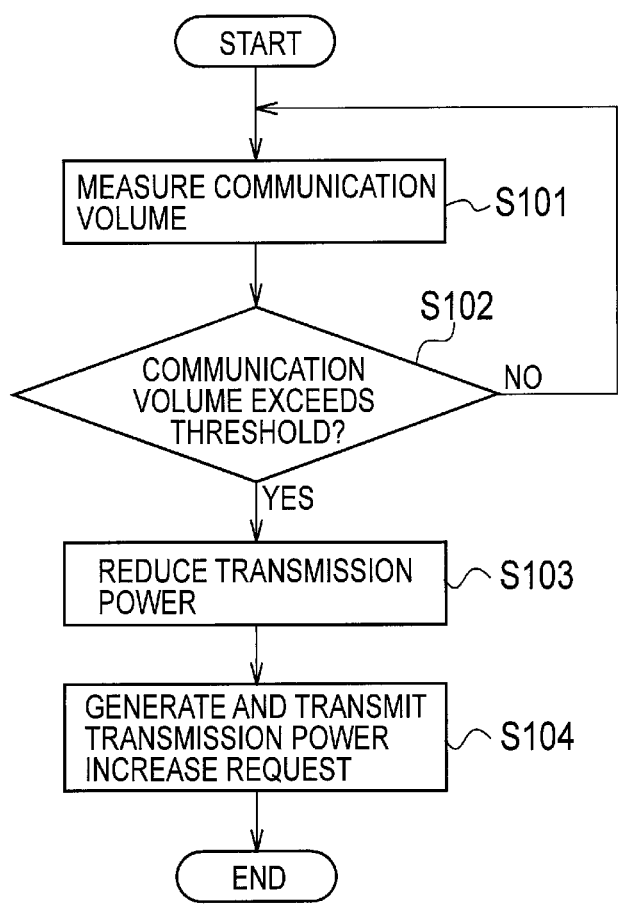

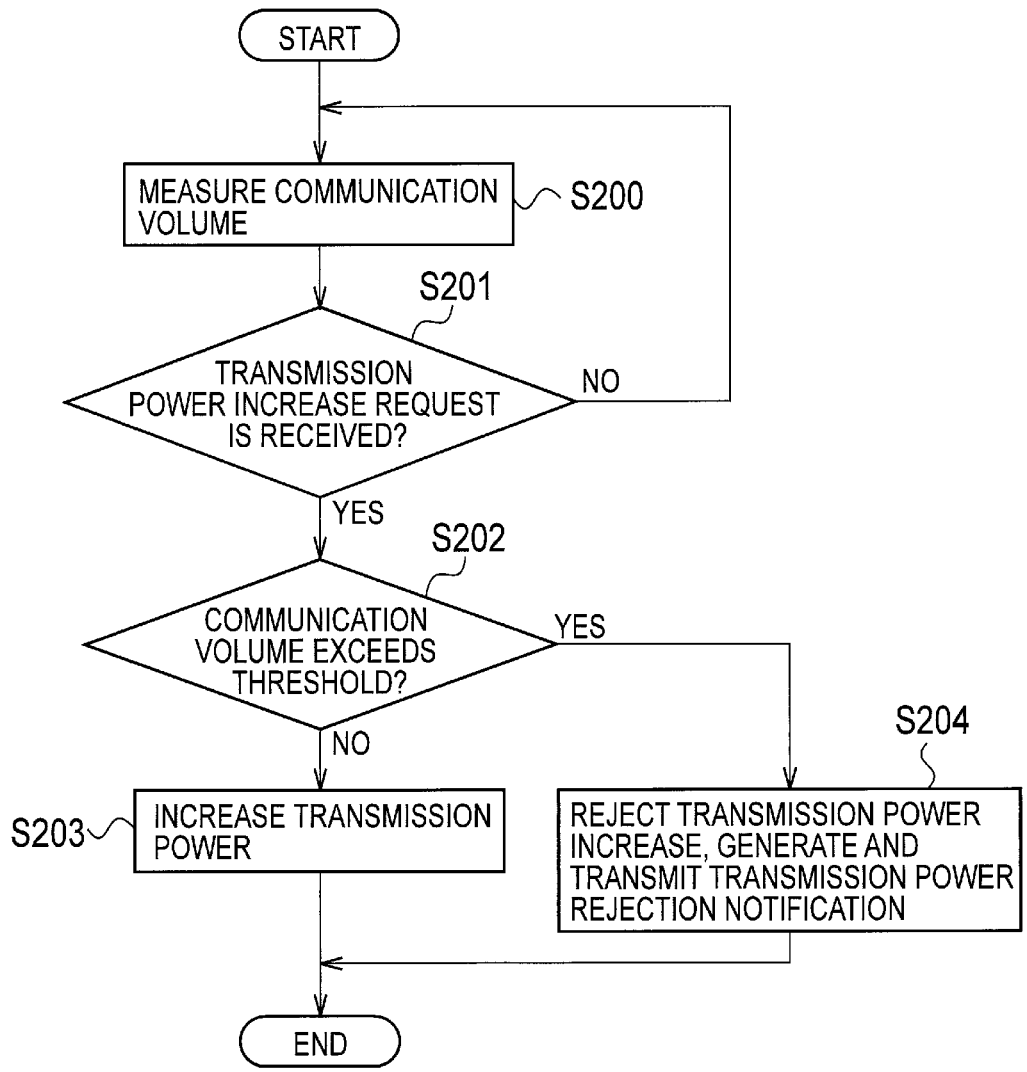

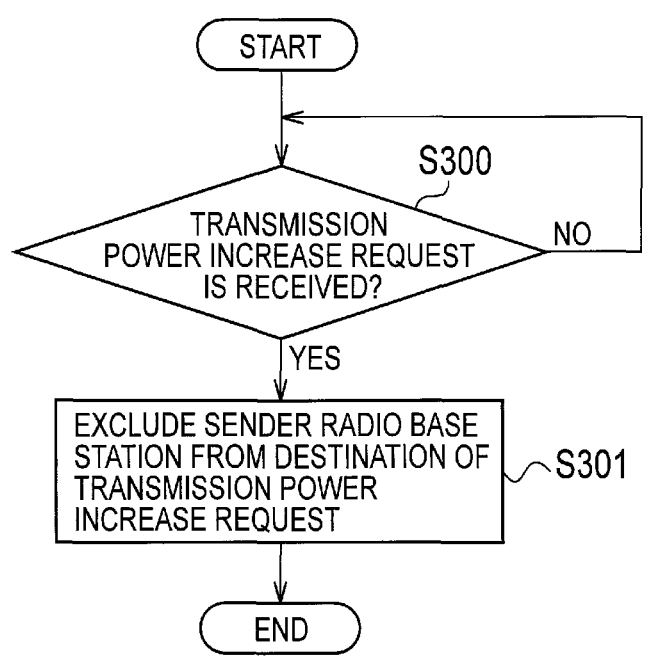

RADIO BASE STATION, AND COMMUNICATION CONTROL METHOD

TECHNICAL FIELD

The present invention relates to a radio base station configured to establish a connection with a radio terminal whose connection destination is determined in accordance with a received power and also relates to a communication control method in the radio base station.

BACKGROUND ART

In radio communication systems including radio base stations and radio terminals, one of neighboring radio base stations is determined as a connection destination of a radio terminal in accordance with received powers of radio signals from the radio base stations.

In a case where radio communications performed by radio terminals existing in a cell that is the communication area provided by a radio base station become equal to or greater than the capacity of the radio base station, the radio base station regulates the communications to reduce the load for the radio communications (refer to Patent Document 1, for example).

PRIOR ART DOCUMENT

Patent Document

PATENT DOCUMENT 1: Japanese Patent Application Publication No. 2006-203305

SUMMARY OF THE INVENTION

The conventional communication regulation method described above, however, has a high possibility that the radio base station will reject new radio communications, i.e., a high possibility of a handover failure, and the connection rate in this radio base station thus decreases. Moreover, as the number of radio terminals in the cell increases, the communication speed of the radio terminals decreases so much that a buffer storing downlink transmission data (downlink buffer) in the radio base station may overflow. Due to the overflow of the downlink buffer, the radio base station has to perform retransmission control and accordingly operate under loaded conditions, which leads to degradation of the quality of the communication service.

In consideration of the above problems, an objective of the present invention is to provide a radio base station and a communication control method which enable a reduction in the load for the radio communications in the radio base station without degrading the quality of the communication service.

The present invention has the following features to solve the problems described above. First of all, a first feature of the present invention is summarized as follows. A radio base station (radio base station 1) configured to perform radio communications with a radio terminal (such as radio terminal 6A), comprises a controller (controller 102) configured to reduce a transmission power of a radio signal and also to request another radio base station to increase a transmission power of a radio signal in the other radio base station in a case where a load for the radio communications exceeds a threshold.

The radio base station described above reduces the transmission power to narrow the communication area and thus to reduce the capacity to accept radio terminals in a case where the load for the radio communications in the radio base station exceeds the threshold. The radio base station thus prevents a handover failure, a decrease in the communication speed of the radio terminals, and retransmission control due to overflow of the downlink buffer and thereby maintains the quality of the communication service. Moreover, the radio base station causes the other radio base station to widen the communication area of the other radio base station by requesting the other radio base station to increase the transmission power. Accordingly, it is possible to compensate the reduction in the capacity to accept radio terminals in the radio base station. In this regard, the quality of the communication service is maintained as well.

A second feature of the present invention is summarized as follows. The threshold is a value lower than an upper limit of the load for the radio communications in the radio base station.

A third feature of the present invention is summarized as follows. The threshold varies on a time-of-day basis.

A fourth feature of the present invention is summarized as follows. The controller increases the transmission power of the radio signal in a case where a request to increase the transmission power of the radio signal is received from the other radio base station, and where the load for the radio communications is lower than the threshold.

A fifth feature of the present invention is summarized as follows. The controller rejects an increase in the transmission power of the radio signal in a case where a request to increase the transmission power of the radio signal is received from the other radio base station, and where the load for the radio communications exceeds the threshold.

A sixth feature of the present invention is summarized as follows. The controller executes processing to transmit a notification indicating that the radio base station rejects an increase in the transmission power of the radio signal to an upper level apparatus and processing in which the radio base station receives a notification indicating that the other radio base station rejects an increase in the transmission power of the radio signal from the upper level apparatus.

A seventh feature of the present invention is summarized as follows. A communication control method in a radio base station configured to perform radio communications with a radio terminal, comprises: reducing a transmission power of a radio signal by the radio base station in a case where a load for the radio communications exceeds a threshold; and requesting, by the radio base station, another radio base station to increase a transmission power of a radio signal in the other radio base station in a case where the load for the radio communications exceeds the threshold.

The present invention enables a reduction in the load for the radio communications in a radio base station without degrading the quality of the communication service.

BRIEF DESCRIPTION OF THE DRAWINGS

FIG. 2 is a configuration diagram of a radio base station according to the embodiment of the present invention.

FIG. 3 is a diagram showing an example of a transmission power increase request and a rejection notification.

FIG. 4 is a flowchart showing a first operation of the radio base station according to the embodiment of the present invention.

FIG. 5 is a flowchart showing a second operation of the radio base station according to the embodiment of the present invention.

FIG. 6 is a flowchart showing a third operation of the radio base station according to the embodiment of the present invention.

DESCRIPTION OF THE EMBODIMENT

Next, an embodiment of the present invention will be described with reference to the drawings. To put it specifically, a description will be given of (1) Configuration of Radio Communication System, (2) Operation of Radio Base Station, (3) Operation and Effects, and (4) Other Embodiment. Note that, in the following description of the drawings of the embodiment below, the same or similar reference signs denote the same or similar portions.

(1) Configuration of Radio Communication System

First, a description will be given of a configuration of a radio communication system according to the embodiment of the present invention in order of (1.1) Overall Schematic Configuration of Radio Communication System and (1.2) Configuration of Radio Base Station.

(1.1) Overall Schematic Configuration of Radio Communication System

Figure 1:
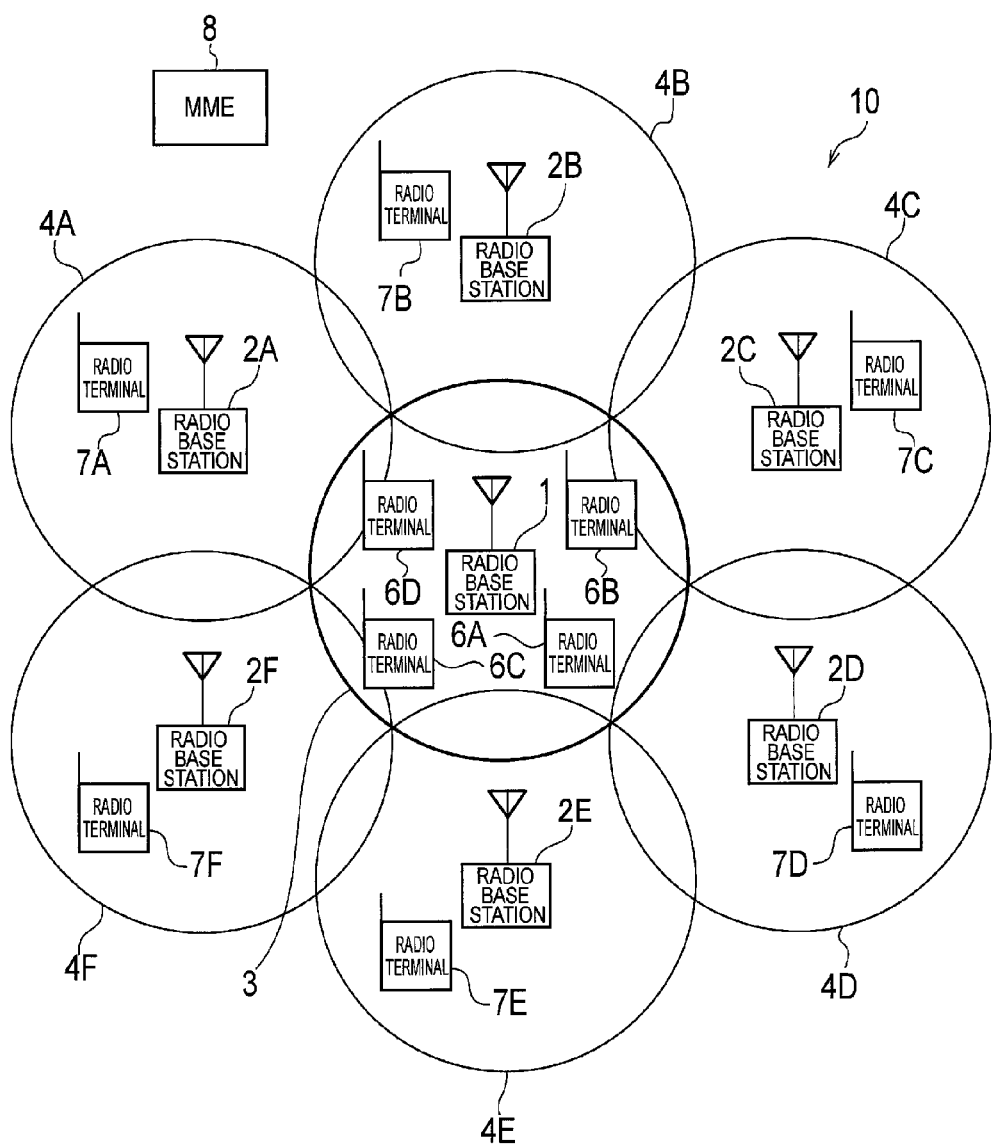
FIG. 1 is an overall schematic configuration diagram of a radio communication system according to an embodiment of the present invention.

FIG. 1 is an overall schematic configuration diagram of a radio communication system 10 according to the embodiment of the present invention.

The radio communication system 10 shown in FIG. 1 includes a configuration based on LTE Release 9, which is a 3.9-generation (3.9G) mobile phone system, or LTE-Advanced, which is considered as a fourth generation (4G) mobile phone system, for example. The radio communication system 10 includes a radio base station 1, radio base stations 2A to 2F, which are located around the radio base station 1, and an MME (Mobile Management Entity) 8 as an upper level apparatus. The radio communication system 10 provides radio communication service to radio terminals 6A to 6D and radio terminals 7A to 7F.

The radio base station 1 transmits a radio signal with a predetermined transmission power and provides a cell 3 as a communication area. Likewise, each of the radio base stations 2A to 2F transmits a radio signal with a predetermined transmission power. Moreover, the radio base stations 2A to 2F provide cells 4A to 4F as communication areas, respectively. The cells 4A to 4F are each divided into multiple sectors (not shown) radially around a corresponding one of the radio base stations 2A to 2F.

In FIG. 1, the radio terminals 6A to 6D exist in the cell 3, which is provided by the radio base station 1. Moreover, the radio terminal 7A exists in the cell 4A, which is provided by the radio base station 2A, and the radio terminal 7B exists in the cell 4B, which is provided by the radio base station 2B, while the radio terminal 7C exists in the cell 4C, which is provided by the radio base station 2C. Furthermore, the radio terminal 7D exists in the cell 4D, which is provided by the radio base station 2D, and the radio terminal 7E exists in the cell 4E, which is provided by the radio base station 2E, while the radio terminal 7F exists in the cell 4F, which is provided by the radio base station 2F.

The MME 8 controls the radio base station 1 and the radio base stations 2A to 2F. The MME 8 connects the radio base station 1 and the radio base stations 2A to 2F together by not-shown wire lines. In addition, an X2 connection (not shown), which is a logical transmission path of a transport layer, is established between the radio base stations.

(1.2) Configuration of Radio Base Station

FIG. 2 is a configuration diagram of the radio base station 1. As shown in FIG. 2, the radio base station 1 includes a controller 102, a storage unit 103, a wired communication unit 104, a radio communication unit 106, and an antenna 108. Note that, the radio base stations 2A to 2F have the same configuration as the radio base station 1.

The controller 102 is configured of a CPU, for example, and controls various functions included in the radio base station 1. The storage unit 103 is configured of a memory, for example, and stores therein various types of information used in control and the like of the radio base station 1. In addition, the region of the storage unit 103 is partially used as a buffer configured to store therein downlink transmission data (downlink buffer).

The wired communication unit 104 performs transmission and reception of data to and from the MME 8. In addition, the wired communication unit 104 performs transmission and reception of data to and from other radio base stations. The radio communication unit 106 includes an RF circuit, a baseband circuit, and the like and performs modulation and demodulation as well as coding and decoding or the like and performs transmission and reception of radio signals to and from the radio terminals 5 via the antenna 108.

The controller 102 includes a transmission power controller 152, a request unit 154, and a notification processor 156.

The transmission power controller 152 measures a communication volume between the radio base station 1 and a radio terminal connected to the radio base station 1 as the information indicating the load for the radio communications in the radio base station 1. Here, in a case where there are multiple radio terminals connected to the radio base station 1, the transmission power controller 152 measures the total value of communication volumes between the radio base station 1 and the multiple radio terminals.

Next, the transmission power controller 152 determines whether or not the communication volume between the radio base station 1 and the radio terminal exceeds a threshold. The threshold is stored in the storage unit 103. In addition, the threshold is a value lower than the upper limit of the communication volume allowed in the radio base station 1, e.g., a value lower than the upper limit of the largest communication volume causing no congestion, a value lower than the upper limit of the communication volume unaccompanied by communication regulation, or the like. Moreover, the threshold is a value that varies on a time-of-day basis.

The transmission power controller 152 selects the threshold corresponding to the current time. For example, the transition of the communication volume over time slots can be acquired from the past statistics. Based on the result of the past statistics, the threshold for a time slot considered to have a large communication volume is set low while the threshold for a time slot considered to have a small communication volume is set high.

Furthermore, in a case where the communication volume exceeds the threshold, the transmission power controller 152 reduces the communication volume, i.e., reduces the transmission power of the radio base station 1 in accordance with a predetermined reduction rate (transmission power reduction rate) by controlling the radio communication unit 106 in order to reduce the load for the radio communications. Here, the larger the difference between the threshold and the communication volume at the current point of time is, the larger the transmission power reduction rate will be. Accordingly, the cell 3 is narrowed and the communication volumes between the radio base station 1 and the radio terminals connected to the radio base station 1 in the cell 3 is reduced.

In a case where the communication volume exceeds the threshold, the request unit 154 generates a transmission power increase request requesting the neighboring radio base stations 2A to 2F to increase the transmission powers. FIG. 3(a) is a diagram showing an example of the transmission power increase request. As shown in FIG. 3(a), the transmission power increase request includes: an ID of the radio base station 1 that is the sender (sender base station ID); an ID of any of the radio base stations 2A to 2F (hereinafter, referred to as "other radio base stations" as appropriate) that is the destination (destination base station ID); and a transmission power increase rate. The IDs of the radio base stations 2A to 2F of the destinations are previously stored in the storage unit 103, for example. In addition, the aforementioned transmission power reduction rate and the transmission power increase rate have a relation where the larger the transmission power reduction rate is, the larger the transmission power increase rate will be.

Furthermore, the request unit 154 transmits the transmission power increase request to the other radio base station of the destination from the wired communication unit 104 via a radio connection by an S1 interface and then through the MME 8. Alternatively, the request unit 154 transmits the transmission power increase request to the other radio base station of the destination from the wired communication unit 104 via an X2 interface. Here, the S1 interface means an interface that connects a radio base station to the core network side. In addition, the X2 interface means an interface that is different from the S1 interface and that connects between two radio base stations.

Meanwhile, in a case where the transmission power increase request is received from any of the neighboring radio base stations 2A to 2F (the other radio base stations), the following processing is performed in the radio base station 1.

To put it specifically, the wired communication unit 104 receives via the S1 interface the transmission power increase request transmitted from the other radio base station through the MME 8. Alternatively, the wired communication unit 104 receives the transmission power increase request from the other radio base station via the X2 interface. The transmission power controller 152 receives information indicating the transmission power request received by the wired communication unit 104 from the other radio base station.

Next, the transmission power controller 152 determines whether or not the communication volume between the radio base station 1 and the radio terminal exceeds the threshold. In a case where the communication volume between the radio base station 1 and the radio terminal is below the threshold, it is conceivable that there is some margin until the communication volume reaches the upper limit of the number of accommodated terminals even if the communication volume is increased. For this reason, in a case where the communication volume is below the threshold, the transmission power controller 152 controls the radio communication unit 106 and thereby increases the transmission power of the radio base station 1 at the transmission power increase rate included in the transmission power increase request. Thus, the cell 3 is widened, and the communication volumes between the radio base station 1 and the radio terminals connected to the radio base station 1 in the cell 3 is increased.

Here, the transmission power controller 152 can increase the transmission power in the direction towards the other radio base station that is the sender of the transmission power increase request. To put it specifically, in the storage unit 103, the ID of the other radio base station is stored while being associated with information indicating the direction towards the other radio base station with the radio base station 1 used as the reference (direction information). The transmission power controller 152 extracts the sender base station ID included in the transmission power increase request and reads the direction information associated with the sender base station ID from the storage unit 103. Thus, the transmission power controller 152 can identify the direction towards the other radio base station that is the sender of the transmission power increase request and increase the transmission power in the direction towards the other radio base station.

Meanwhile, in a case where the communication volume between the radio base station 1 and the radio terminal is equal to or greater than the threshold, the transmission power controller 152 rejects the request and does not increase the transmission power.

In this case, the notification processor 156 generates a transmission power increase rejection notification that is the information indicating the rejection of an increase in the transmission power. FIG. 3(b) is a diagram showing an example of the transmission power increase rejection notification. As shown in FIG. 3(b), the transmission power increase rejection notification includes: the ID of the radio base station 1 that is the sender (sender base station ID); the ID of any of the radio base stations 2A to 2F (the other radio base stations) that is the destination (destination base station ID); and contents of the rejection notification. The ID of the destination radio base station is the ID of the sender radio base station included in the transmission power increase request. Furthermore, the notification processor 156 transmits the transmission power increase rejection notification to the MME 8 via the wired communication unit 104 and the S1 interface.

The MME 8 transmits the received transmission power increase rejection notification to the other radio base station of the destination.

Meanwhile, in a case where the transmission power increase rejection notification is received from any of the neighboring radio base stations 2A to 2F (the other radio base stations) via the MME 8, the following processing is performed in the radio base station 1.

To put it specifically, the transmission power controller 152 receives the transmission power increase rejection notification from the other radio base station via the MME 8, the S1 interface, and the wired communication unit 104. Next, the transmission power controller 152 cancels the control of reducing the transmission power in the direction towards the other radio base station corresponding to the ID of the sender radio base station included in the transmission power increase rejection notification.

Here, the transmission power controller 152 can increase the transmission power in the direction towards the other radio base station that is the sender of the transmission power increase rejection notification. To put it specifically, in the storage unit 103, the ID of the other radio base station is stored while being associated with information indicating the direction toward the other radio base station with the radio base station 1 used as the reference (direction information) as in the case described above. The transmission power controller 152 extracts the sender base station ID included in the transmission power increase rejection notification and reads the direction information associated with the sender base station ID from the storage unit 103. Thus, the transmission power controller 152 can identify the direction towards the other radio base station that is the sender of the transmission power increase rejection request notification and increase the transmission power in the direction towards the other radio base station.

Moreover, the transmission power controller 152 excludes the other radio base station corresponding to the ID of the sender radio base station included in the transmission power increase rejection notification for a predetermined period of time from the transmission destination of the transmission power increase request to be transmitted thereafter.

Moreover, in a case where the transmission power increase rejection notification is received from some of the other radio base stations that are the destinations of the transmission power increase request, the transmission power controller 152 performs processing to issue an alarm (first alarm) to a not-shown upper level network side apparatus (first alarm processing). Moreover, in a case where the transmission power increase rejection notification is received from all of the other radio base stations that are the destinations of the transmission power increase request, the transmission power controller 152 performs processing to issue an alarm indicating a higher degree of urgency than the first alarm (second alarm) to the not-shown upper level network side apparatus.

(2) Operation of Radio Base Station

Next, a description will be given of operations of the radio base station 1. FIG. 4 is a flowchart showing a first operation of the radio base station 1.

In step S100, the controller 102 measures the communication volume between the radio base station 1 and a radio terminal connected to the radio base station 1. In step S102, the controller 102 determines whether or not the measured communication volume exceeds the threshold.

In a case where the communication volume does not exceed the threshold, the operation to measure the communication volume in step S100 and the subsequent operation are repeated.

Meanwhile, in a case where the communication volume exceeds the threshold, the controller 102 reduces the transmission power of the radio base station 1 in accordance with the transmission power reduction rate in order to reduce the communication volume in step S103.

Furthermore, the controller 102 generates and transmits the transmission power increase request to the neighboring radio base stations 2A to 2F in step S104.

FIG. 5 is a flowchart showing a second operation of the radio base station 1.

In step S200, the controller 102 measures the communication volume between the radio base station 1 and a radio terminal connected to the radio base station 1. In step S201, the controller 102 determines whether or not a transmission power increase request is received from any of the radio base stations 2A to 2F (the other radio base stations). In a case where no transmission power increase request is received, the operation to measure the communication volume in step S200 and the subsequent operation are repeated.

Meanwhile, in a case where a transmission power increase request is received, the controller 102 determines whether or not the communication volume exceeds the threshold in step S202.

In a case where the communication volume does not exceed the threshold, the controller 102 increases the transmission power in accordance with the transmission power increase rate included in the received transmission power increase request in step S203.

Meanwhile, in a case where the communication volume exceeds the threshold, the controller 102 rejects an increase in the transmission power and generates and transmits the transmission power increase rejection notification to the other radio base station of the sender of the transmission power increase request in step S204.

FIG. 6 is a flowchart showing a third operation of the radio base station 1.

In step S300, the controller 102 determines whether or not a transmission power increase rejection notification is received from the other radio base stations.

In a case where a transmission power increase rejection notification is received, the controller 102 excludes the other radio base station corresponding to the ID of the sender radio base station included in the transmission power increase rejection notification for a predetermined period of time from the transmission destination of the transmission power increase request to be transmitted thereafter.

(3) Operation and Effects

In the radio communication system 10 according to the embodiment of the present invention, in a case where the communication volume between the radio base station 1 and a radio terminal connected to the radio base station 1 exceeds the threshold, the radio base station 1 reduces the transmission power of a radio signal in the radio base station 1 and also requests another radio base station to increase the transmission power of a radio signal in the other radio base station.

Accordingly, a reduction in the transmission power of the radio base station 1, i.e., a reduction of the load for the radio communications in the radio base station 1 widens the cell 3, which is the communication area of the radio base station 1, and thereby reduces the communication volume. Thus, a handover failure, a decrease in the communication rate of the radio terminals, and retransmission control due to overflow of the downlink buffer can be prevented and thus the quality of the communication service can be maintained. Meanwhile, the reduction in the capacity to accept terminals in the radio base station 1 can be compensated by the other radio base station increasing its transmission power to widen the cell that is the communication area of the other radio base station and thereby increase the communication volume between the other radio base station and the radio terminal. Thus, in this regard, the quality of the communication service can be maintained.

In addition, the threshold is a value lower than the upper limit of the communication volume in the radio base station 1. Thus, the transmission power control is performed before the communication volume reaches the upper limit. Accordingly, it is made possible to prevent degradation of the quality of the communication service before the quality of the communication service is degraded considerably.

In addition, the threshold varies on a time-of-day basis. Thus, it is possible to set an appropriate threshold in accordance with the actual transition of the communication volume.

Moreover, the radio base station 1 increases the transmission power of the radio signal in a case where a transmission power increase request is received from any of the other radio base stations, and also the communication volume is lower than the threshold.

Thus, through the increase in the transmission power of the radio base station 1, the cell that is the communication area of the radio base station 1 is widened and thereby the communication volume between the radio base station 1 and the radio terminals is increased. Accordingly, it is made possible to compensate the reduction in the communication volume between the other radio base station and the radio terminals. Thus, it is possible to maintain the quality of the communication service.

Figure 7:
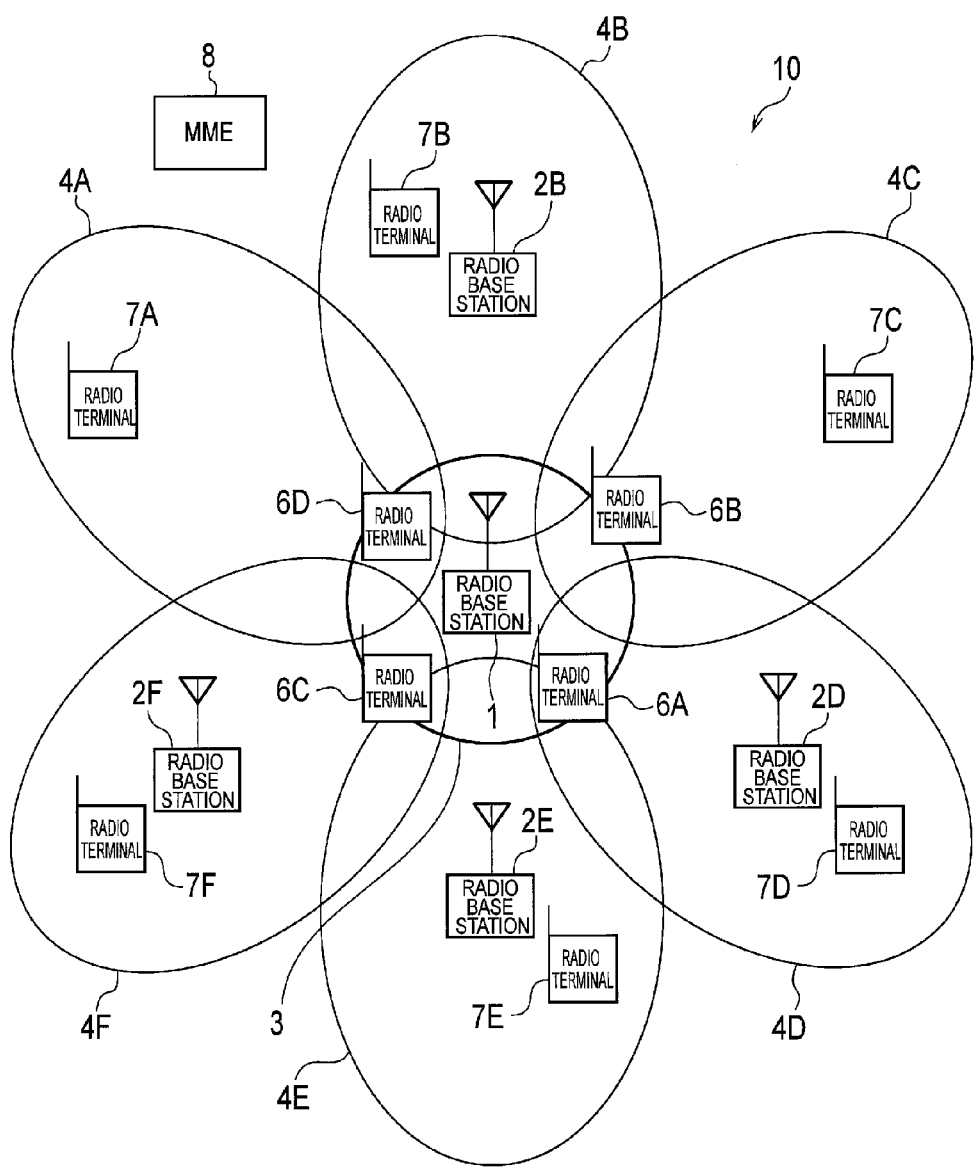
FIG. 7 is a diagram showing the state of cells after transmission power control of the radio communication system according to the embodiment of the present invention.

FIG. 7 is a diagram showing the states of the cells after the transmission power control of the radio communication system 10. Compared with FIG. 1, in FIG. 7, while the cell 3, which is the communication area of the radio base station 1, is smaller, the cells 4A to 4E, which are the communication areas of the radio base stations 2A to 2F, are larger. Accordingly, it is made possible to compensate the reduction in the communication volume between the radio base station 1 and a radio terminal by an increase in the communication volume between any of the other radio base stations and a radio terminal. Thus, it is possible to maintain the quality of the communication service.

(4) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the aforementioned embodiment, the communication volume between the radio base station 1 and a radio terminal is used as the load for the radio communications, but the number of radio terminals connected to the radio base station 1, the processing load of the controller 102 in the radio communications, or the like may be used as the load for the radio communications.

Moreover, the threshold to be compared with the communication volume between the radio base station 1 and a radio terminal may be set to a value indicating the use condition of Physical Resource Block (PRB). For example, 100% PRB utilization in the radio base station 1 is set to be the threshold.

Here, the state where the PRB utilization is 100% alone does not necessarily mean that the call capacity in the radio base station 1 reaches the upper limit or that congestion occurs. This is because the upper limit of the call capacity in the radio base station 1 depends on the communication volume of each of the calls and changes as needed.

For this reason, the transmission power controller 152 judges that the number of calls equal to or greater than the upper limit of the call capacity in the radio base station 1 occurs, i.e., that congestion occurs, in a case where the PRB utilization stays at 100% for at least a predetermined period of time or constantly.

In a case where the number of calls equal to or greater than the upper limit of the call capacity in the radio base station 1 occurs, an attempt to distribute the load into the other radio base stations is made. To put it specifically, the request unit 154 generates the transmission power increase request requesting the neighboring radio base stations 2A to 2F to increase the transmission power and transmits the transmission power increase request to the radio base stations 2A to 2F.

As described above, the present invention naturally includes various embodiments which are not described herein. Accordingly, the technical scope of the present invention should be determined only by the matters to define the invention in the scope of claims regarded as appropriate based on the description.

The entire contents of Japanese Patent Application No. 2009-293512 (filed on Dec. 24, 2009) are herein incorporated by reference.

INDUSTRIAL APPLICABILITY

The radio base station and the communication control method of the present invention enable a reduction in the load for the radio communications in the radio base station without degrading the quality of the communication service and thus are useful as a radio base station and a communication control method.

The invention claimed is:

1. A radio base station configured to perform radio communications with a radio terminal, comprising:
a controller configured to reduce transmission power of a radio signal by the base station and also to request another radio base station to increase transmission power of a radio signal in the another radio base station in a case where a load for the radio communications by the base station exceeds a threshold.

2. The radio base station according to claim 1, wherein the threshold is a value lower than an upper limit of the load for the radio communications in the radio base station.

3. The radio base station according to claim 1, wherein the threshold varies on a time-of-day basis.

4. The radio base station according to claim 1, wherein the controller increases the transmission power of the radio signal in a case where a request to increase the transmission power of the radio signal is received from the other radio base station, and where the load for the radio communications is lower than the threshold.

5. The radio base station according to claim 1, wherein the controller rejects an increase in the transmission power of the radio signal in a case where a request to increase the transmission power of the radio signal is received from the other radio base station, and where the load for the radio communications exceeds the threshold.

6. The radio base station according to claim 5, wherein the controller executes processing to transmit a notification indicating that the radio base station rejects an increase in the transmission power of the radio signal to an upper level apparatus and processing in which the radio base station receives a notification indicating that the other radio base station rejects an increase in the transmission power of the radio signal from the upper level apparatus.

7. A communication control method in a radio base station configured to perform radio communications with a radio terminal, comprising:
reducing a transmission power of a radio signal by the radio base station in a case where a load for the radio communications exceeds a threshold; and
requesting, by the radio base station, another radio base station to increase a transmission power of a radio signal in the other radio base station in a case where the load for the radio communications by the base station exceeds the threshold.

* * * * *